Patented Apr. 10, 1951

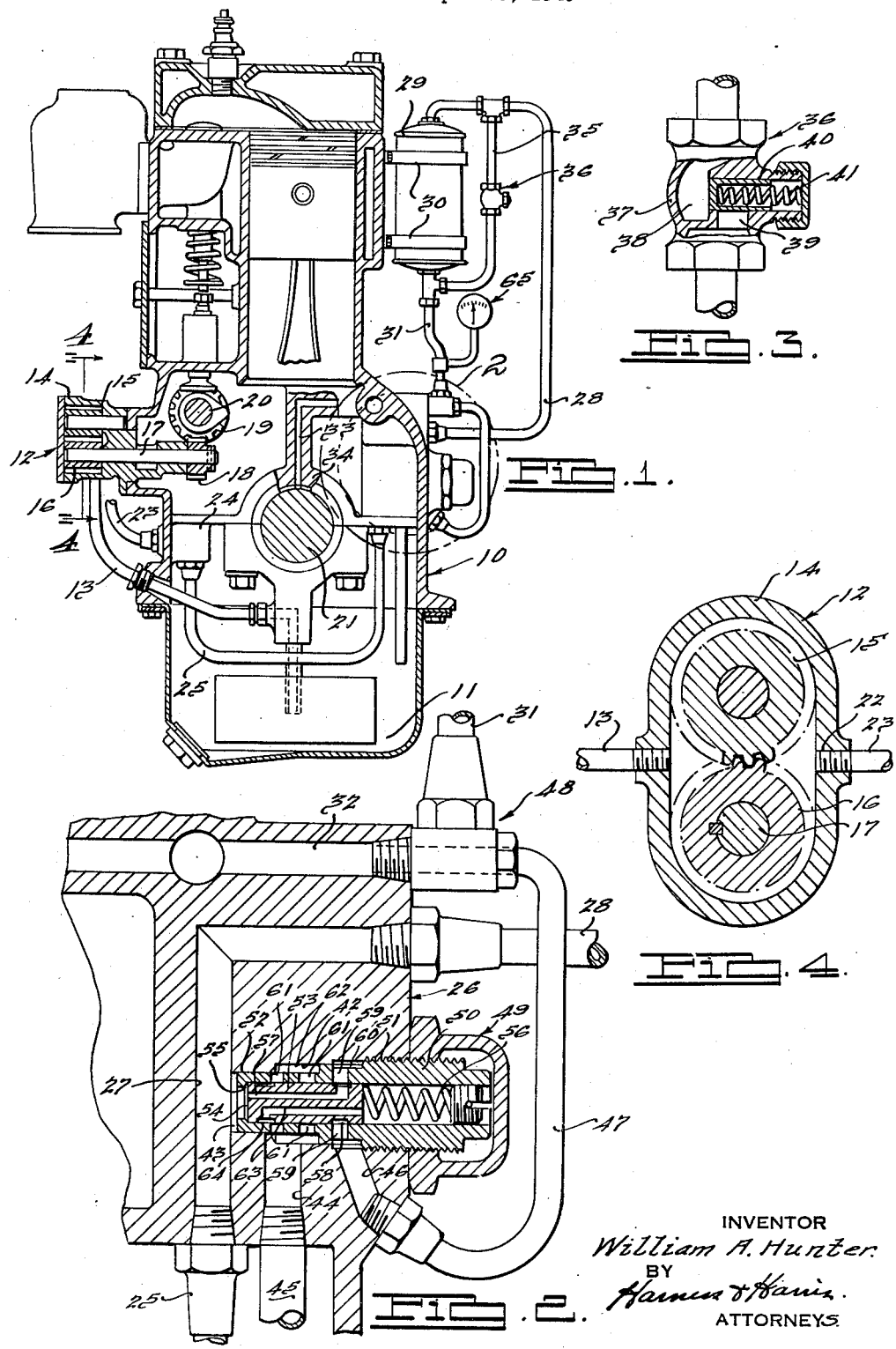

2,548,160

UNITED STATES PATENT OFFICE 2,548,160

ENGINE LUBRICATING SYSTEM

William A. Hunter, Highland Park, Mich., assignor to Chrysler Corporation, Highland Park, Mich., a corporation of Delaware Application September 15, 1945, Serial No. 616,496

11 Claims. (Cl. 184—6)

This invention relates to an improved lubricant system for internal combustion engines.

More specifically the invention pertains to a lubricating system of this character which is particularly adapted for lubricating internal combustion engines of motor vehicles.

It has heretofore been the practice, in engine lubricating systems having a full flow filter, to locate the regulating valve with which such systems are conveniently provided on the downstream side of filter. With this arrangement the filter is not protected against excessive pressures and all of the lubricant displaced from the sump of the system is required to pass through the filter unit whether or not a portion of the lubricant is spilled by the regulating valve directly into the sump. Thus, the filter is called upon to accommodate the passage of more than the quantity of lubricant actually circulated to the parts of the engine to be lubricated.

Full flow filtering lubricating systems are generally provided with a by-pass having a valve responsive to pressure of a predetermined value created by the pump of a lubricating system for accommodating the flow of lubricant around the filter when the latter becomes clogged. Frequently, the pump fails to produce sufficient pressure to open such a by-pass valve when, for example, the engine is operated at idling speeds while the lubricant is hot and thin and as a result the lubricating system fails for a period to supply oil to the moving parts of the engine if the filter is clogged.

One of the main objects of the invention is to provide a full flow filter through which all of the oil supplied to the parts of the engine to be lubricated is normally filtered during each circulation of lubricant through the system.

Another object of the invention is to provide a pressure regulating valve in a system of this kind which is so located, with respect to the direction of flow of lubricant, on the upstream side of the filter as to limit the pressure to which the filter and remaining portions of the system are subjected without requiring the filter to operate upon any of the oil which is returned to the sump of the system by the action of the regulating valve in limiting the pressure in the system.

A further object of the invention is to provide in an engine lubricating system a pressure regulating valve which is adapted to establish a direct flow of lubricant from the pump and around the filter of the system when the pressure created by the pump is insufficient to open the valve of the normal filter by-pass in order to assure at least some flow of oil to the moving parts of the engine even though the filter is clogged and the filter by-pass valve is closed.

An additional object of the invention is to provide a pressure regulating valve in an engine lubricating and filtering system which is located in advance of the filter and normal filter by-pass so that opening of the normal filter by-pass valve when the filter becomes clogged produces a pressure drop in the gallery which is indicated by the gallery pressure indicating gage with which lubricating systems of this character are conventionally provided in order that the latter gage may serve the additional function of indicating when the filter requires cleaning or replacement.

An illustrative embodiment of the invention is shown in the accompanying drawing, in which:

Fig. 1 is a transverse, vertical sectional view of an internal combustion engine having a lubricating system embodying the invention.

Fig. 2 is an enlarged, fragmentary sectional view, partly in section, of structure within the circle designated by the numeral 2 in Fig. 1 and showing the pressure regulating valve and its connections in my improved lubricating system.

Fig. 3 is an enlarged side elevational view, partly in section, of the normal filter by-pass valve of my improved lubricating system.

Fig. 4 is a fragmentary vertical sectional view taken on the line 4—4 of Fig. 1.

In the form of the invention illustrated in the drawing, the engine, generally designated by the numeral 10, is provided with an oil sump 11 from which oil is supplied to the inlet of a pump, generally designated by the numeral 12, by a conduit 13. The pump 12 comprises a casing 14 in which is mounted a pair of gears 15 and 16. The gear 16 is fixed on a shaft 17 which extends into the crank case of the engine and which is provided with a pinion 18. The pinion 18 is meshed with gear teeth 19 formed on a cam shaft 20 which is drivingly rotated in a conventional manner in timed relation with respect to the crankshaft 21 of the engine.

The pump has an outlet 22 which is communicatively connected by tubing 23 with a chamber 24, preferably formed integral with the crank case of the engine. The chamber 24, which merely serves to provide a fluid communicative connection between the inside and outside of the crank case, has an outlet to which a tube 25 is connected. The tube 25 extends transversely across the crank case to the side of the engine opposite from that on which the pump 12 is located and is connected to a pressure regulator valve housing, generally designated by the numeral 26, as illustrated in Fig. 2. The pressure regulator valve housing 26 is provided with a passageway 27 through which lubricant may be conducted under the pressure applied thereon by the pump 12. To the outlet end of the passageway 27 is connected a tube 28 which extends externally of the engine to a location adjacent the upper extremity of the engine. A filter 29 of any suitable conventional construction is mounted on the cylinder block of the engine by a pair of bands 30. The filter 29 is preferably provided with sufficient flow capacity to accommodate, while operatively clean, full flow of all the lubricant required to lubricate the engine. The tube 28 is connected to the inlet of the filter 29, which is located at the upper extremity thereof, a tube 31 is connected at one end with the outlet of the filter 29 and at its other end with the lubricant gallery 32 to the engine from which all of the parts of the engine to be lubricated are supplied with oil. The branch lubricating passage 33, shown in Fig. 1, illustrates the supplying of oil to one main crankshaft bearing 34 of the engine. Other moving parts of the engine may be correspondingly supplied with oil from other branch passages (not shown) leading from the gallery 32. After the lubricant has been discharged from the various branch passages of the gallery 32, it drips downwardly and is collected in the oil sump 11 at the lower extremity of the engine.

A filter by-pass passageway around the filter 29 is provided by a conduit 35 in which is mounted a normally closed pressure responsive valve, generally designated by the numeral 36. The pressure responsive valve 36 comprises a body portion 37 having offset passage sections 38 and 39. The passage section 39 of the valve body is normally closed by a shiftable valve element 40, which is yieldably held in its closed position by a coil spring 41. The tension of the coil spring 41 is predetermined to hold the valve element 40 in its closed position, shown in Fig. 3, until the pressure of the lubricant in the passage section 38 of the valve exceeds a predetermined value such as would be obtained when the filter element (not shown) of the filter 29 becomes inoperatively clogged by particles of dirt and other foreign matter, which it removes from the lubricant. When the valve 40 is opened by attainment of pressure thereon in excess of the predetermined value, the conduit 35 conducts lubricant around the filter so as to assure supply of lubricant to the gallery 32 when the filter element is clogged.

Provided in the pressure regulating valve housing structure 26, which is preferably formed integral with the crank case of the engine, is a pressure regulator valve chamber 42 of generally cylindrical shape which communicates at its inner extremity 43 with the passageway 27. Formed in the regulator valve housing 26 is a passageway 44, which communicates at one end with the regulator valve chamber 42 and at its opposite end with a tube 45 leading downwardly to the lubricant sump 11 of the engine. Another passageway 46 is provided in the regulator valve housing which also communicates at one end with the pressure regulator valve chamber 42. The other end of the passageway 46 communicates with a tube 47 which leads directly from the passageway 46 to the gallery 32 of the lubricating system. In the illustration shown in the drawing, the tube 47 and the tube 31 are communicatively connected with the gallery 32 by a fitting, generally designated by the numeral 48. The passageway 46 and the tube 47 form a second by-pass passageway by which lubricant may be supplied directly to the gallery 32 without passing through the filter in the manner and under the conditions hereinafter set forth.

A pressure regulating valve, generally designated by the numeral 49, extends into the chamber 42 and comprises a stationary sleeve portion 50 which is threaded in the outer end of the chamber 42, as illustrated at 51. The sleeve 50 has a reduced inner end portion 52 which closely fits within the correspondingly reduced inner end portion 43 of the chamber 42.

Shiftably mounted in the sleeve 50 is a valve element 53 which is provided with a bevelled inner extremity 54 that seats upon a bevelled seat 55 provided at the adjacent end of the sleeve 50. The valve element 53 is normally yieldably urged leftwardly, as viewed in Fig. 2, by a coil spring 56. Formed in the shiftable valve element 53 is a passage 57 which extends from the inner end of the valve element to a ring groove 58 formed in the periphery of the valve element. When the valve element 53 is in its innermost position, the ring groove 58 registers with ports 59 extending through the wall of the sleeve 50, which leads to a ring groove 60 formed in the outer periphery of the sleeve 50. The ring groove 60 communicates with the passage 46 for supplying lubricant to the tube 47 and gallery 32 without requiring it to flow through the filter. The quantity of lubricant thus supplied to the gallery is sufficient to lubricate the moving parts of the engine when the pressure of the lubricant is below that required to pass it through an operatively clean filter and yet not high enough to open the filter by-pass valve 36. Conditions such as this have been found to occur when, for example, the lubricant is hot and the filter is partially or completely clogged and due to the heated condition of the lubricant the pump fails to create sufficient pressure, during idling or slow speed operation, to open the valve 36 of the by-pass 35.

When the pressure of the lubricant has attained a sufficient value to force oil through a normally clean filter, this pressure initially shifts the valve element 53 rightwardly, far enough to bring the ring groove 58 of the valve element 53 out of registration with the ports 59 in the valve housing without uncovering the ports 61 in the valve housing. This setting of the valve element 53 cuts off the supply of lubricant to the tube 47 without allowing lubricant to escape through the passageway 44 and thus the lubricant is fed through the filter.

The spring 56 is predetermined to allow the shiftable valve element 53 to move further rightwardly away from the seat 55 when a predetermined maximum pressure is developed in the system. When this condition exists, the valve element 53 is shifted rightwardly against the action of the spring 56 until it uncovers ports 61 formed in the wall of the sleeve 50. When the valve is in the latter position the ring groove 58 is out of registration with the ports 59 and the flow of lubricant through the passage 57 is obstructed. The ports 61 communicate with a ring groove 62 formed in the regulator valve housing 26 and which communicate with the passageway 44. When the valve element 53 is moved to its rightward position, lubricant is allowed to escape from the passageway 27 through the passageway 44 and tube 45 by which it is delivered to the lubricant sump 11. Thus the pressure regulating valve by which the lubricating system is protected from pressures in excess of a predetermined value, also serves as a pressure responsive valve for obstructing the emergency supply of lubricant through the by-pass passageway provided by the passageway 46 and tube 47 when there is an ample supply of lubricant fed through the filter discharge passageway provided by the tube 31. Any lubricant which seeps between the inner wall of the sleeve 50 and the shiftable valve element 53 may be exhausted through the passage 63 which leads from the right extremity of the valve element to a ring groove 64 formed in the periphery of the valve element and which overlaps at least one of the ports 61 in all positions of the valve element 53.

It will be seen that in the foregoing structure, the pressure regulating valve and the escapement outlet from the system which it controls is located on the upstream side of the filter and therefore any lubricant which is exhausted from the outlet passageway of the pump is returned to the sump before it has been required to pass through the filter. The pressure regulating valve is also so constructed and arranged as to accommodate an emergency supply of lubricant when, for example, as stated above, the pump fails to produce sufficient pressure to open the valve of the normal filter by-pass and the filter is either clogged or partially clogged, thus assuring an ample supply of lubricant to the moving parts of the engine under such conditions. This emergency supply is effectively cut off by the pressure regulating valve when the conditions are such that there is available an ample supply of lubricant.

The lubricating system may be provided with a conventional pressure gage, generally designated by the numeral 65, which is preferably connected with the passageway leading from the outlet of the filter. When the gage 65 is so located in the system with respect to the location of the pressure regulating valve 49, this gage may be relied upon to give the operator an indication when the filter element of the filter 29 is clogged and when the replacement or cleaning thereof is necessary. This indication results from a pressure drop which is shown by the gage 65 when the valve 36 is opened to accommodate by-passing of lubricant around the filter 29. The force required to hold the shiftable valve element 40 of the valve 36 in its rightward position, as viewed in Fig. 3, against the action of the spring 41, produces a drop in pressure which is shown by the gage 65.

Although but one specific embodiment of the invention is herein shown and described, it will be understood that various changes in the sequence of operations, steps and materials employed may be made without departing from the spirit of the invention.

I claim:

1. An engine lubricating system including a lubricant sump, a pump connected with said sump for withdrawing lubricant therefrom, a filter having an inlet and an outlet, an outlet passageway leading from said pump to said filter for supplying lubricant under pressure to the latter, means including a lubricant delivery passage communicating with said filter for supplying lubricant therefrom to parts of an engine to be lubricated, a by-pass passageway connected at one end with said pump outlet passageway and at its other end with said lubricant delivery passage, a pressure responsive valve normally closing said by-pass passageway and adapted to accommodate the flow of lubricant through said by-pass passageway when the pressure on said valve is raised to a predetermined value after said filter becomes clogged, an emergency lubricant supply passageway leading from said pump outlet passageway to said lubricant delivery passage and by-passing said filter for supplying lubricant from said pump directly to said parts of said engine to be lubricated without passing it through said filter, and a pressure responsive valve in said emergency lubricant passageway for obstructing the flow of lubricant therethrough when the pressure of the lubricant in said pump outlet passageway exceeds a predetermined value.

2. An engine lubricating system including a lubricant sump, a pump connected with said sump for withdrawing lubricant therefrom, a filter having an inlet and an outlet, an outlet passageway leading from said pump to said filter for supplying lubricant under pressure to the latter, means including a lubricant delivery passage communicating with said filter for supplying lubricant therefrom to parts of an engine to be lubricated, a by-pass passageway connected at one end with said pump outlet passageway and at its other end with said lubricant delivery passage, a pressure responsive valve normally closing said by-pass passageway and adapted to accommodate the flow of lubricant through said by-pass passageway when the pressure on said valve is raised to a predetermined value after said filter becomes clogged, an emergency lubricant supply passageway leading from said pump outlet passageway to said lubricant delivery passage and by-passing said filter for supplying lubricant from said pump directly to said parts of said engine to be lubricated without passing through said filter, and a pressure regulating valve in said emergency lubricant passageway having an outlet to said sump and including a valve element normally obstructing the flow of lubricant through said emergency lubricant passageway and through said valve outlet when the pressure on the lubricant in said pump outlet passageway is between predetermined high and low values, said valve element being shiftable to accommodate flow of lubricant through said valve outlet when said pressure exceeds said predetermined high value and to accommodate the flow of lubricant through said emergency lubricant supply passageway when said pressure falls below said predetermined low value.

3. A fluid system including a sump, a pump having an inlet and outlet, a filter having an inlet and outlet, means communicatively connecting said pump inlet and outlet to said sump and filter inlet, respectively, means communicatively connected with said filter outlet for conducting fluid therefrom to the locations at which it is to be utilized, a passageway for conducting fluid discharged by said pump around said filter to said locations, and valve mechanism for controlling the flow of fluid through said passageway including a shiftable valve element and yieldable means for holding it in open position, said valve element being shiftable to its closed position against the action of said means by the pressure of the fluid on the inlet side of said filter when said pressure exceeds a predetermined value sufficient to force fluid through said filter.

4. An engine lubricating system including a sump, an engine driven pump having an inlet and outlet, a filter having an inlet and outlet, a pump inlet passageway connecting said sump and pump inlet, a pump outlet passageway connecting said filter inlet and said pump outlet, a filter discharge passageway leading from said filter outlet to parts of said engine to be lubricated, a by-pass passageway connecting said pump outlet passageway and said filter discharge passageway for conducting lubricant around said filter, and a valve mechanism in said by-pass passageway including a shiftable valve element and a resilient yieldable member for holding it in open position, said valve element being responsive to the pressure of said lubricant on the discharge side of said pump for closing said by-pass passageway when said pressure exceeds a predetermined value, said valve mechanism being adapted to accommodate sufficient flow of lubricant to said engine parts to lubricate the same when the pressure applied on the lubricant by said pump is insufficient to force it through said filter.

5. An engine lubricating system including a sump, an engine driven pump having an inlet and outlet, a filter having an inlet and outlet, a pump inlet passageway connecting said sump and pump inlet, a pump outlet passageway connecting said filter inlet and said pump outlet, a filter discharge passageway leading from said filter outlet to parts of said engine to be lubricated, a pair of by-pass passageways each connecting said pump outlet passageway and said filter discharge passageway for conducting lubricant around said filter; a normally closed valve in one of said by-pass passageways adapted to open in response to pressure of said lubricant of a predetermined value to accommodate the flow of lubricant from said pump outlet passageway to said filter discharge passageway when said filter is clogged, and a second valve for controlling the flow of lubricant through the other by-pass passageway adapted to close it in response to pressure of said lubricant of a lower predetermined value, said second valve accommodating a flow of lubricant to said engine parts when said pressure is insufficient to force lubricant through said filter and insufficient to open said normally closed valve.

6. An engine lubricating system including a sump, an engine driven pump having an inlet and outlet, a filter having an inlet and outlet, a pump inlet passageway connecting said sump and pump inlet, a pump outlet passageway connecting said filter inlet and said pump outlet, a filter discharge passageway leading from said filter outlet to parts of said engine to be lubricated, a pair of by-pass passageways each connecting said pump outlet passageway and said filter discharge passageway for conducting lubricant around said filter, a normally closed valve in one of said by-pass passageways adapted to open in response to pressure of said lubricant of a predetermined value to accommodate the flow of lubricant from said pump outlet passageway to said filter discharge passageway when said filter is clogged, and pressure regulating valve mechanism in the other by-pass passageway having a lubricant outlet leading to said sump and including a valve element for controlling the flow of lubricant through said outlet and responsive to a pressure higher than said predetermined value for accommodating a flow of lubricant to said sump to limit the maximum pressure attainable in said system, said valve element being also adapted to accommodate the flow of lubricant from said pump directly to said engine parts when the pressure of said lubricant is insufficient to force lubricant through said filter and below the value required to open said normally closed valve and being responsive to pressure of said lubricant of a value below said predetermined value for obstructing the flow of lubricant through said last mentioned by-pass passage.

7. An engine lubricating system including a sump, an engine driven pump having an inlet and outlet, a filter having an inlet and outlet, a pump inlet passageway connecting said sump and pump inlet, a pump outlet passageway connecting said filter inlet and said pump outlet, a filter discharge passageway leading from said filter outlet to parts of said engine to be lubricated, a pair of by-pass passageways each connecting said pump outlet passageway and said filter discharge passageway for conducting lubricant around said filter, a normally closed valve in one of said by-pass passageways adapted to open in response to pressure of said lubricant of a predetermined value to accommodate the flow of lubricant from said pump outlet passageway to said filter discharge passageway when said filter is clogged, pressure regulating valve mechanism in the other by-pass passageway having a lubricant outlet leading to said sump and including a valve element for controlling the flow of lubricant through said outlet and responsive to a pressure higher than said predetermined value for accommodating a flow of lubricant to said sump to limit the maximum pressure attainable in said system, said valve element being also adapted to accommodate the flow of lubricant from said pump directly to said engine parts when the pressure of said lubricant is insufficient to force lubricant through said filter and below the value required to open said normally closed valve and being responsive to pressure of said lubricant of a value below said predetermined value for obstructing the flow of lubricant through said last mentioned by-pass passage, and a fluid pressure gage connected with said filter discharge passage adapted to indicate by a drop in its pressure indication when said filter is clogged.

8. In an engine lubricating system having a pump and filter, regulating valve mechanism including a casing having a relief outlet for accommodating escapement of lubricant to limit the pressure attainable in said system and having a by-pass outlet for supplying lubricant to the moving parts of said engine without requiring the lubricant to pass through said filter, a shiftable valve element in said casing responsive to lubricant pressure, and means for yieldably positioning said valve element to maintain said by-pass outlet open until said lubricant pressure reaches a predetermined value sufficient to force lubricant through an operatively clean filter, said valve element being shiftable by pressure of said predetermined value to a position for maintaining both of said outlets closed and being further shiftable by pressure of a predetermined higher value for maintaining said by-pass outlet closed and opening said relief outlet.

9. An engine lubricating system including a lubricating sump, a full flow filter, a lubricant pressure creating pump, a first conduit connecting said sump with said pump, a passageway connecting said pump with said filter, a second conduit leading from said filter to the parts of an engine to be lubricated, regulating valve mechanism operatively associated with said passageway at a location between said pump and said filter including a casing having a relief outlet for accommodating escapement of lubricant from said passageway to said sump to limit the pressure attainable in said system and having a bypass outlet for supplying lubricant to the moving parts of said engine without requiring the lubricant to pass through said filter, a shiftable valve element in said casing responsive to lubricant pressure, and means for yieldably positioning said valve element to maintain said by-pass outlet open until said lubricant pressure reaches a predetermined value sufficient to force lubricant through an operatively clean filter, said valve element being shiftable by pressure of said predetermined value to a position for maintaining both of said outlets closed and being further shiftable by pressure of a predetermined higher value for maintaining said by-pass outlet closed and opening said relief outlet.

10. In an engine lubricating system having a pump and filter, regulating valve mechanism including a casing having a by-pass outlet for supplying lubricant to the moving parts of said engine without requiring the lubricant to pass through said filter, a shiftable valve element in said casing responsive to lubricant pressure, and means for yieldably positioning said valve element to maintain said by-pass outlet open until said lubricant pressure reaches a predetermined valve sufficient to force lubricant through an operatively clean filter, said valve element being shiftable by pressure of said predetermined valve to a position for maintaining said by-pass outlet closed.

11. A fluid system including a sump, a pump having an inlet and outlet, fluid conducting means connecting said sump to said pump inlet, a filter having an inlet and outlet, fluid conducting means connecting said pump outlet and said filter inlet, means connected to said filter outlet for delivering fluid to the locations it is to be utilized, a by-pass passageway for conducting fluid discharged by said pump around said filter to said locations, and valve mechanism in said passageway having means for maintaining said passageway open until a predetermined pressure is reached in said system, said valve means closing said by-pass passageway in response to a pressure greater than said predetermined amount.

WILLIAM A. HUNTER.

REFERENCES CITED

The following references are of record in the file of this patent:

UNITED STATES PATENTS

| Number | Name | Date |
| --- | --- | --- |
| 1,020,774 | Nilson | Mar. 19, 1912 |
| 1,638,281 | Winslow | Aug. 9, 1927 |
| 1,703,335 | Bower | Feb. 26, 1929 |
| 2,108,798 | Dalrymple | Feb. 22, 1938 |